Dec. 2, 1930.  T. J. KNIGHT  1,783,508
FARM GATE
Filed April 15, 1930   4 Sheets-Sheet 1
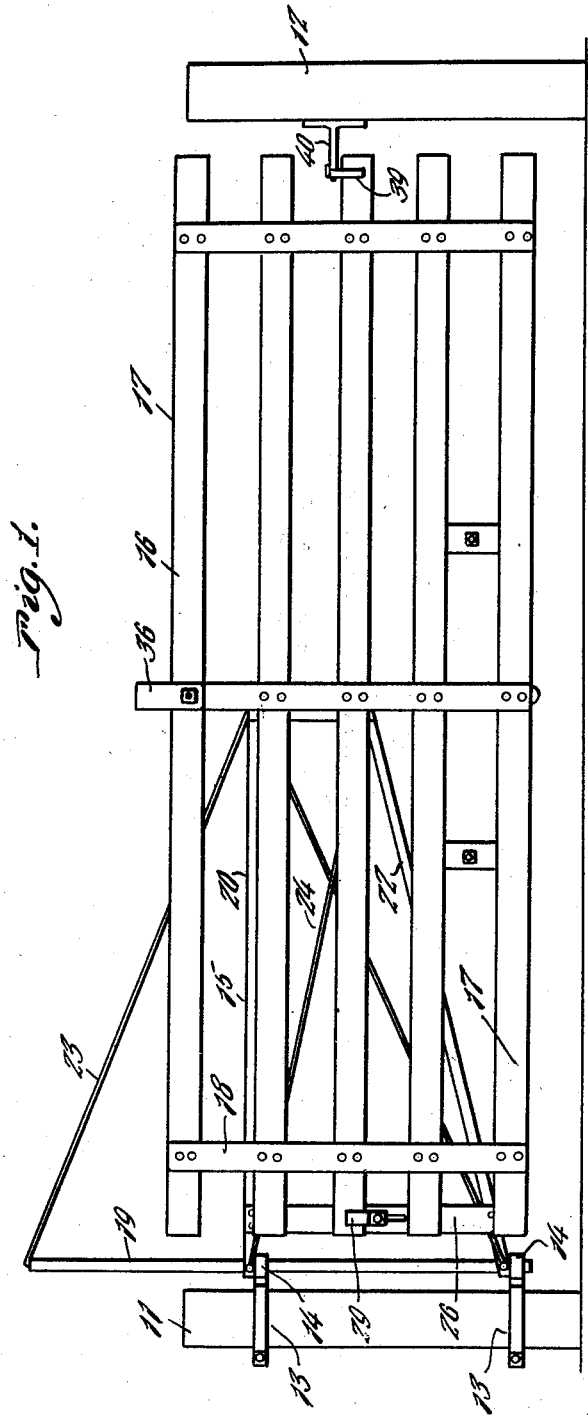
Inventor
*T. J. Knight*
By *Clarence A. O'Brien*
Attorney

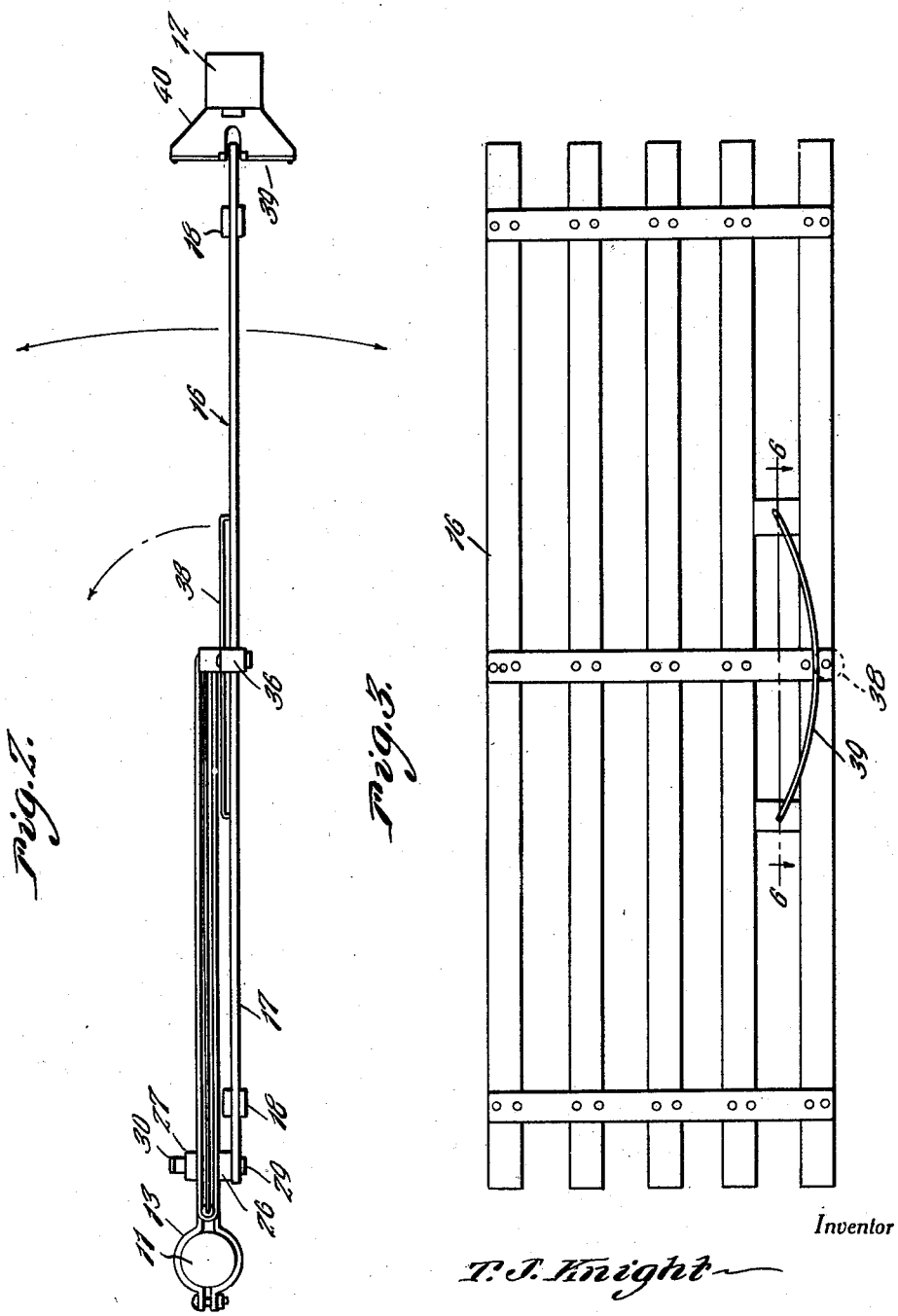

Dec. 2, 1930.  T. J. KNIGHT  1,783,508
FARM GATE
Filed April 15, 1930  4 Sheets-Sheet 3
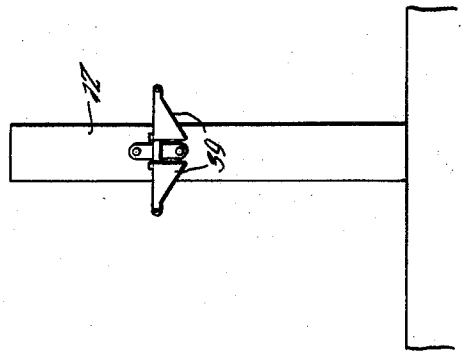
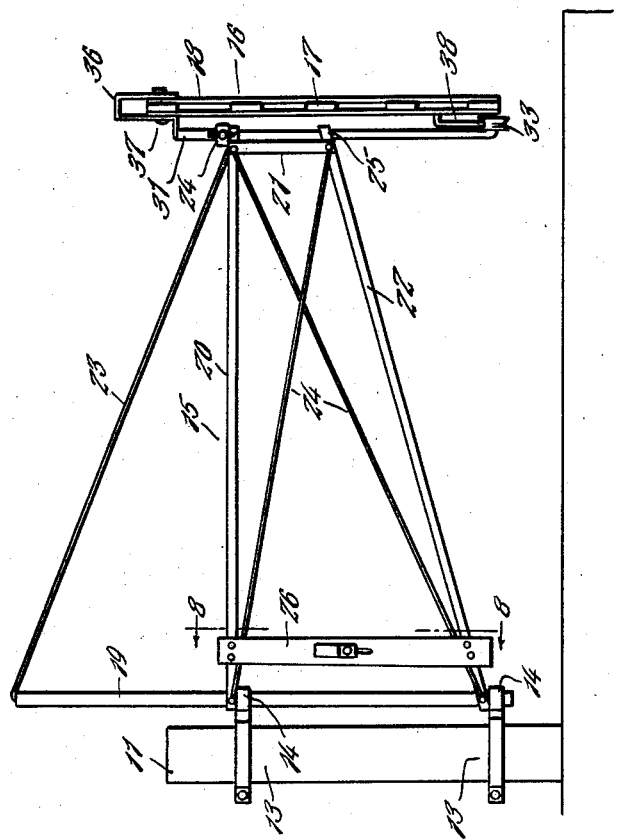
Inventor
T. J. Knight
By Clarence A. O'Brien
Attorney Dec. 2, 1930. T. J. KNIGHT 1,783,508
FARM GATE
Filed April 15, 1930 4 Sheets-Sheet 4
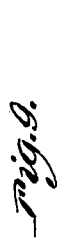
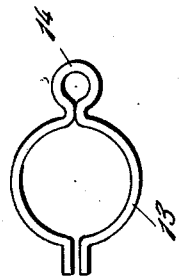
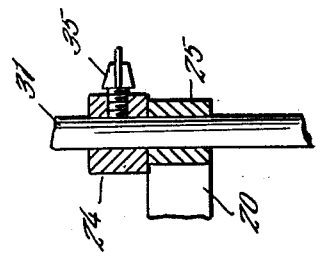
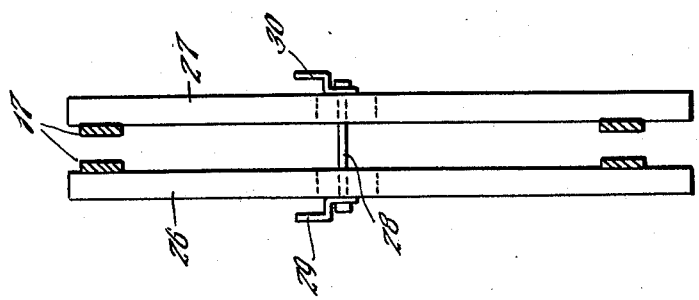
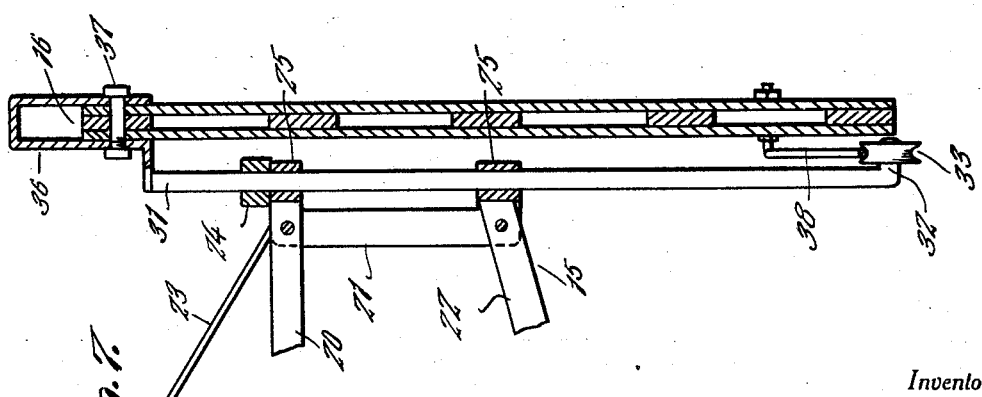
Inventor
*T. J. Knight*
By *Clarence A. O'Brien*
Attorney Patented Dec. 2, 1930

1,783,508

UNITED STATES PATENT OFFICE

TROY J. KNIGHT, OF GOLDEN, ILLINOIS

FARM GATE

Application filed April 15, 1930. Serial No. 444,470.

This invention relates to an improved farm gate of a multiple movement type which is susceptible of general utility on the farm and which is especially useful to facilitate the regulation of stock and cattle in passing into and out of the enclosure or field in which the gate structure is installed.

Briefly stated, the gate construction is characterized by a pair of longitudinally spaced posts one of which constitutes the primary support for the gate and the other one of which carries a suitable latching means for aiding in holding the gate in a closed position.

The gate construction is individual in that it includes two primary parts; namely, a horizontally swingable hinge and carrier frame having vertical axial connections with the supporting post, together with an open-work gate proper which has swingable, tiltable, and adjustable connection with the free end portions of the frame.

Novelty is predicted upon the provision of a suitable carrier frame which is independently swingable of the gate, and, under certain conditions, bodily swingable with the gate.

Another feature of the construction is the horizontal pivotal connection between the central portion of the gate and the swingable end of the hinge frame, together with a suitable rocking mechanism allowing the gate to be tilted in a vertical plane to raise either end thereof away from the ground to facilitate the passage therebeneath of small animals such as pigs, hogs, and the like.

Other structural features and advantages will become more readily apparent from the following description and drawings.

In the drawings:

Figure 1 is an elevational view of the complete post and gate construction with the gate in locked closed position.

Figure 2 is a top plan view thereof.

Figure 3 is an inside elevational view of the gate proper (per se).

Figure 4 is an elevational view showing the gate bodily swung around at right angles to the free end of the horizontally swingable frame, the frame being located in alinement with the post.

Figure 5 is an inside elevational view of the retaining means on the latch post.

Figure 6 is a horizontal sectional view on the line 6—6 of Figure 1.

Figure 7 is a detail sectional view of the vertical axis of the centrally counter-balanced gate.

Figure 8 is a vertical section taken substantially on the plane of the line 8—8 of Figure 4.

Figure 9 is a detail view of the supporting post clamp.

Figure 10 is a detail sectional view of the gate pivot and adjustable stop collar arrangement.

In the general assembly shown in Figure 1, the reference character 11 designates what may be denoted as the primary supporting post and 12 designates the longitudinally spaced latch post. Embracing the post 11 at vertically spaced points are suitable clamps 13 each of which is provided with a pivot eye 14 (see Figure 9). These pivot eyes serve to swingably mount the carrier frame 15 on the post 11. The general arrangement of this frame may well be seen in Figure 4.

The gate proper is generally represented by the numeral 16 and the gate is of openwork design and includes horizontal rails 17 connected together by vertical battens 18. It will be noticed in Figure 1 that the gate is of a length somewhat less than the distance between the posts 11 and 12. Moreover it is swingable as a unit with the frame 13 and also individually swingable with respect to the frame having an unusual multiple movement.

By structurally analyzing the frame 15 represented in Figure 4 it will be seen that it comprises a vertically disposed standard 19 swingably mounted in the pivot eyes 14. Extending out from this standard is a top rail 20 connected at its outer end by a tie 21 with an inclined bottom rail 22. The numeral 23 designates a reinforcing guy wire which extends from the top of the standard 19 down to and is connected with the forward end portion of the upper rail 20. The numerals 24 designate intersecting braces.

It will be noted that the rails 20 and 22 are formed with terminal bearings 25. These bearings are shown in Figure 7 as being formed integral with the connecting tie 21 and the tie is in turn fastened to the end of the rails 20 and 22. This entire frame structure is swingable in a horizontal plane around with the vertical pivot standard 19.

The numerals 26, and 27 represent vertical struts located on opposite sides of the gate as seen in Figure 8. Passing through these struts is an adjusting and retaining bolt 28, having retaining brackets 29 and 30 associated with the opposite ends thereof. These brackets permit the adjacent end portion of the gate to be fastened on either side of the frame. In other words, it may be fastened in the bracket 29 on one side of the frame as represented in Figure 1 or the gate may be swung around through another revolution to bring it around on the opposite side at which time the end rails of the gate are fastended in the bracket 30.

I now invite attention to Figure 7, wherein it will be seen that the numeral 31 designates a vertical spindle which is journalled for longitudinal adjustment and rotation in the bearings 25. The lower end of this spindle is directed laterally outward as at 32 and forms a journal for a grooved pulley 33.

The numeral 24 designates a stop collar having a set screw 35 which as seen in Figure 10 allows the spindle to be raised up and down to bodily elevate or lower the gate. A U-shaped connecting bracket 36 is fastened to the upper end of the spindle and has its arm portions straddling the upper central portion of the top rail of the gate. A horizontal pivot 37 forms a connection between the bracket and the gate, thus suspending the gate in a counter-balanced style intermediate its ends.

The gate thus has swinging motion around the vertical axis 31, and may be lifted up or down in a vertical plane by rocking around the horizontal pivot or axis. In this connection it will be noted that the numeral 38 designates a longitudinally bowed rocker or track which cooperates with the pulley 33.

With this arrangement, the gate is susceptible of having either end raised or lowered during which time the gate swings about the horizontal axis 37 and the track 38 rides in the groove of the pulley 33. The gate is counter-balanced however, and therefore self-levelling and under normal conditions assumes approximately level state as represented in Figure 1.

This double acting connection between the gate and the frame is important, especially in view of the fact that the vertical pivot 31 is adjustably associated with the bearing 25 permitting the gate and its appurtenances to be bodily elevated or lowered to provide the desired clearance between the bottom of the gate and the ground.

The keepers 39 of the retaining latch mechanism on the post 12 are fastened thereto through the medium of appropriate attaching brackets 40. The latches are so arranged as to take over the intermediate rail of the gate. Thus the gate may be fastened to the latch post at one end and fastened at the opposite end to the right angular retaining brackets or keepers 29 or 30 according to the side of the frame on which the gate is positioned.

With this arrangement, the frame and the gate as a unit may be swung in and out between the posts in a horizontal plane. When desired however, the gate may be disconnected from the retaining means on the frame, at which time it may be independently swung in a horizontal plane around the vertical spindle 31. Moreover the gate still has a third movement, and that is a rocking or tilting motion provided by the horizontal pivot 37 and the cooperating pulley and track arrangement at the bottom of the spindle bolt.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. In a structure of the class described, in combination, a fixedly mounted post, hinge means on said post, a swingable frame embodying a vertical standard pivotally connected with the hinge means, a pair of upper and lower spaced rails and bracing means, said rails terminating in vertically spaced bearings at their free swingable ends, a pair of complemental struts fastened to opposite sides of the frame adjacent the hinge connection, adjustable retaining keepers associated with said struts, a gate having a central spindle mounted in said bearings, said gate being swingable into overlapping relationship with either side of the frame and said keepers functioning to hold the gate in either of these positions.

2. In a structure of the class described, in combination, a supporting post, a hingedly mounted frame thereon, said frame including bearings at its free end, a gate, a vertically disposed spindle slidably and rotatably mounted in said bearings, means connecting the upper end of the spindle with the corresponding portion of the gate, said means including a horizontal pivot bolt permitting rocking motion of the gate with respect to the spindle, a guide pulley on the lower end of the spindle, and a curvate fixedly mounted track on the lower portion of the gate cooperable with said pulley, said gate being thus counter-balanced for self-levelling purposes and being capable of rocking and tilting motion in a vertical plane with respect to the posts.

In testimony whereof I affix my signature.
TROY J. KNIGHT.